(12) United States Patent
Shimizu et al.

(10) Patent No.: US 7,957,693 B2
(45) Date of Patent: Jun. 7, 2011

(54) WIRELESS RELAY AMPLIFICATION APPARATUS

(75) Inventors: Hideaki Shimizu, Fussa (JP); Masahiro Matsuda, Kodaira (JP); Hideo Imai, Inagi (JP); Masaki Suto, Sendai (JP)

(73) Assignee: Hitachi Kokusai Electric Inc., Tokyo (JP)

( * ) Notice: Subject to any disclaimer, the term of this patent is extended or adjusted under 35 U.S.C. 154(b) by 434 days.

(21) Appl. No.: 12/212,267

(22) Filed: Sep. 17, 2008

(65) Prior Publication Data

US 2009/0093212 A1 Apr. 9, 2009

(30) Foreign Application Priority Data

Sep. 26, 2007 (JP) ................................. 2007-250203
Sep. 9, 2008 (JP) ................................. 2008-231151

(51) Int. Cl.
*H04Q 7/20* (2006.01)
(52) U.S. Cl. ................. 455/11.1; 455/7; 455/9; 455/24; 455/422.1; 455/67.11; 370/315; 370/310; 370/317; 375/260
(58) Field of Classification Search ................ 455/11.1, 455/7, 9, 12.1–13.3, 422.1, 24, 403, 67.11, 455/445, 550.1, 426.1, 426.2, 500, 517; 370/315, 370/310, 317, 316; 375/260
See application file for complete search history.

(56) References Cited

U.S. PATENT DOCUMENTS

| 6,934,511 B1 * | 8/2005 | Lovinggood et al. ........ 455/11.1 |
| 7,280,611 B2 * | 10/2007 | Orihashi et al. .............. 375/296 |
| 2006/0014491 A1 * | 1/2006 | Cleveland ....................... 455/17 |

FOREIGN PATENT DOCUMENTS

JP 2000-286772 10/2000

* cited by examiner

*Primary Examiner* — Keith T Ferguson
(74) *Attorney, Agent, or Firm* — Bacon & Thomas PLLC

(57) ABSTRACT

A wireless relay amplification apparatus includes an interference canceller which generates cancellation waves to cancel interference waves from a mobile station antenna, which are included in downlink signals received by the base station antenna, a downlink amplifier which amplifies downlink signals from which the interference waves have been canceled by the interference canceller, an uplink amplifier which amplifies uplink signals received by the mobile station antenna, a receiver which detects a level of received signals based on the downlink signals from which the cancellation waves have been canceled by the interference canceller, and outputs a propagation loss calculated based on a difference between the detected reception level and a transmission level of the base station included in notification information in the downlink signals, and a controller which controls gain of at least one of the downlink amplifier and the uplink amplifier based on the propagation loss output by the receiver.

5 Claims, 5 Drawing Sheets

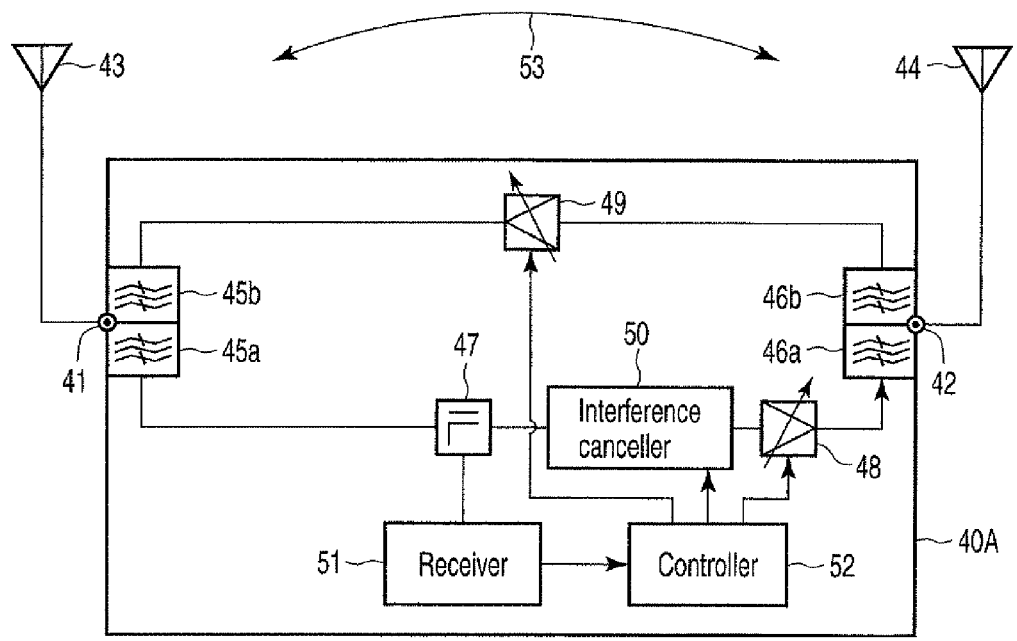
F I G. 1
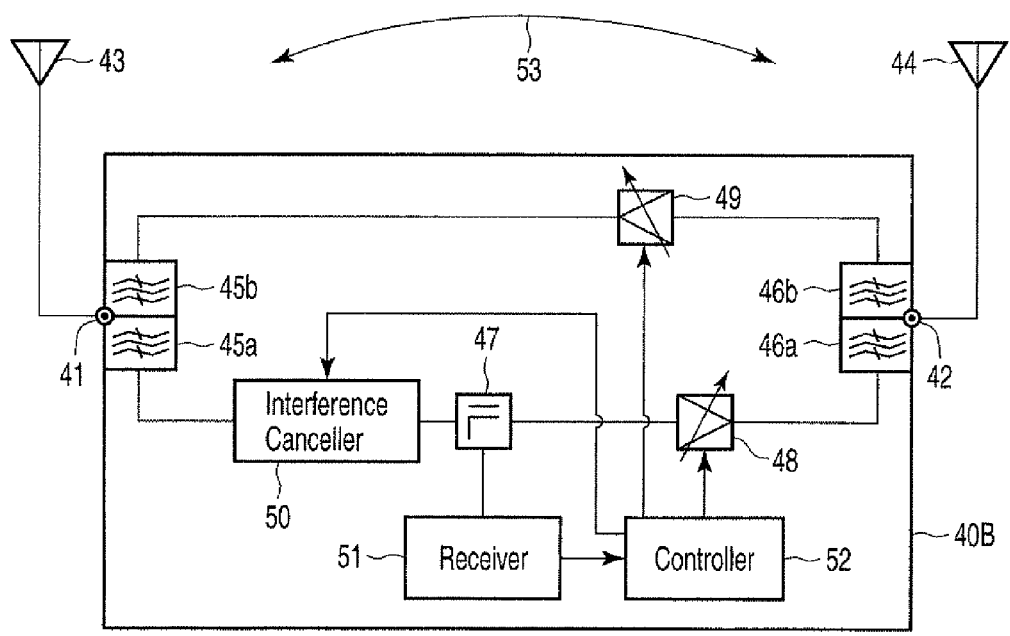
F I G. 2

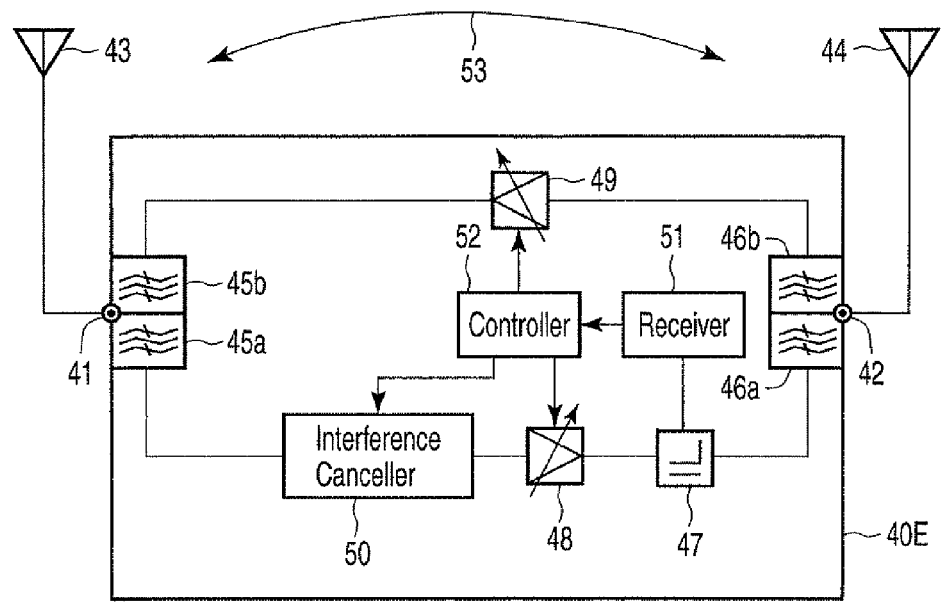
F I G. 5
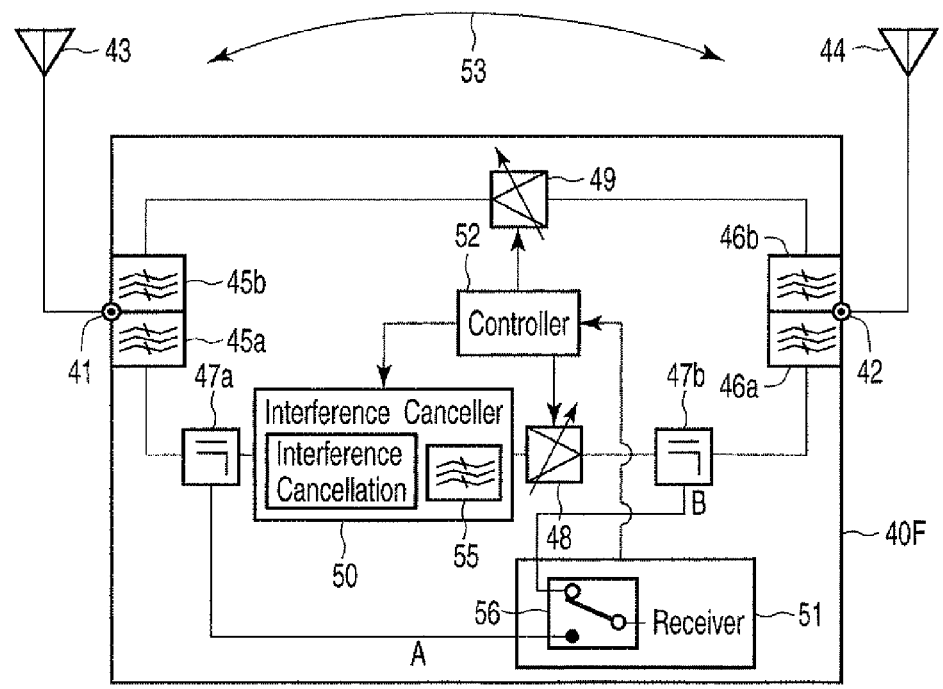
F I G. 6

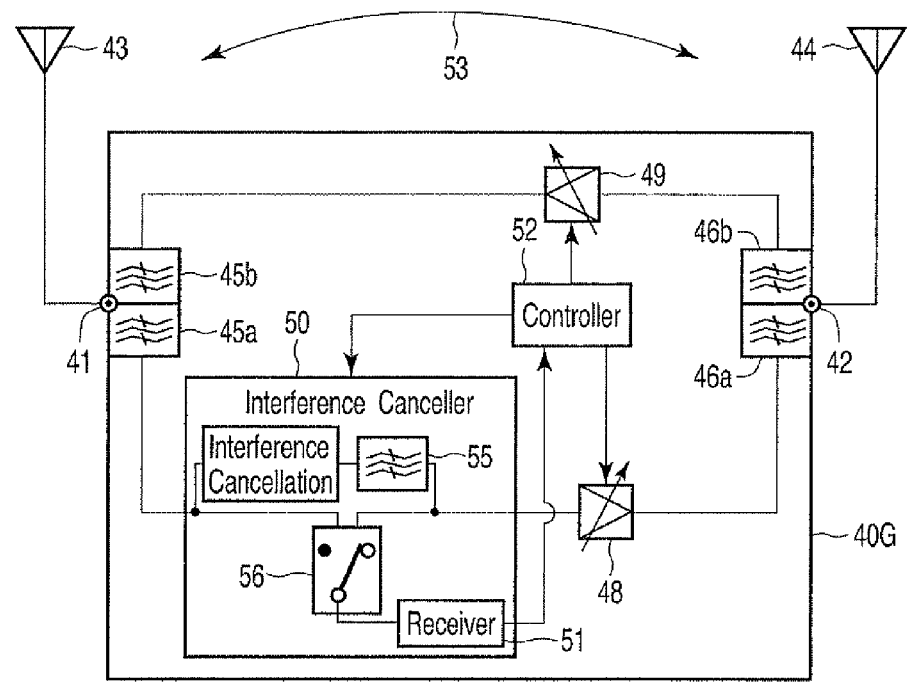
F I G. 7
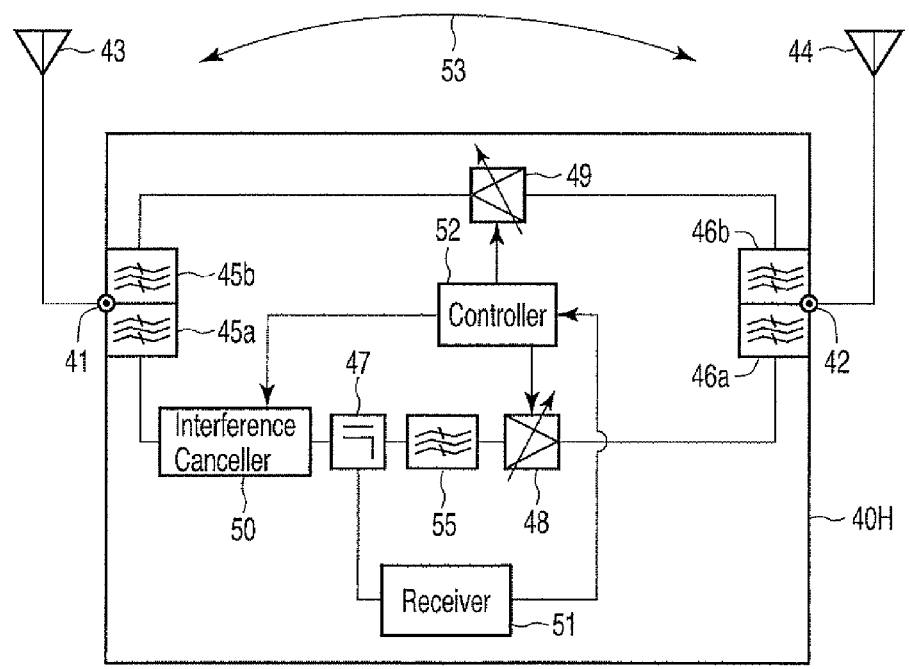
F I G. 8

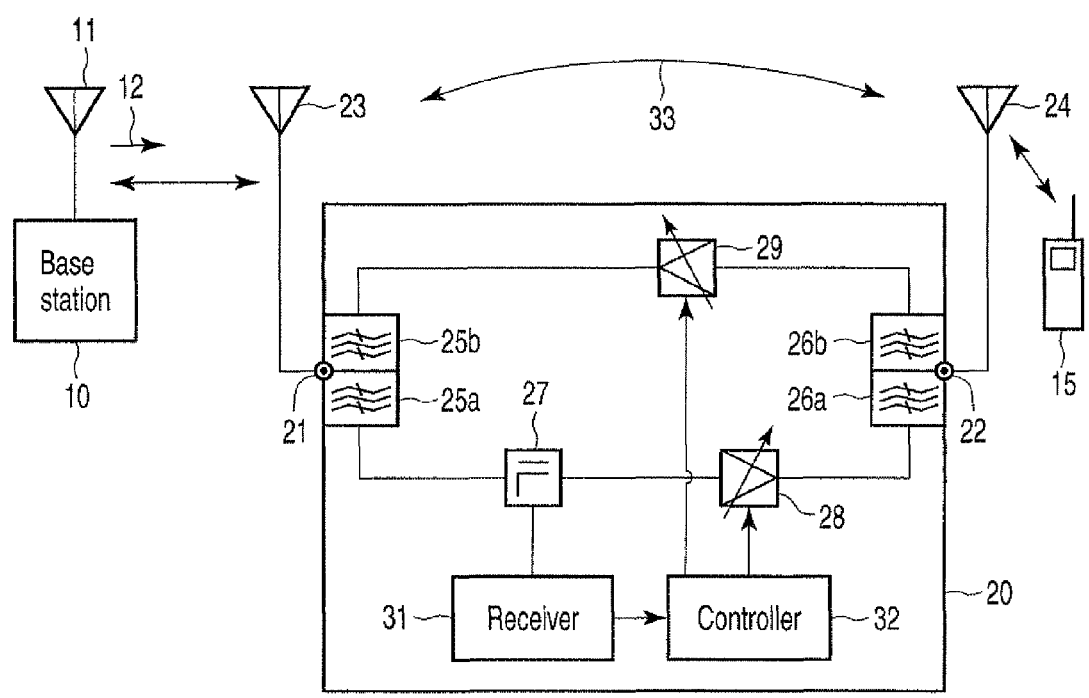
F I G. 9

WIRELESS RELAY AMPLIFICATION APPARATUS

CROSS-REFERENCE TO RELATED APPLICATIONS

This application is based upon and claims the benefit of priority from prior Japanese Patent Applications No. 2007-250203, filed Sep. 26, 2007; and No. 2008-231151, filed Sep. 9, 2008, the entire contents of both of which are incorporated herein by reference.

BACKGROUND OF THE INVENTION

1. Field of the Invention

The present invention relates to a wireless relay amplification apparatus which relays radio waves between a base station and a mobile station.

2. Description of the Related Art

The wireless relay amplification apparatus relays radio waves between a base station and a user terminal apparatus such as a mobile phone as a mobile station. The wireless relay amplification apparatus amplifies and transmits radio waves from the base station to broaden the area within which the user terminal apparatus can be used. Similarly, the wireless relay amplification apparatus amplifies and transmits radio waves transmitted by the user terminal apparatus to the base station.

FIG. 9 is a block diagram showing a configuration example of a conventional wireless relay amplification apparatus 20 which relays radio waves between a base station 10 and a user terminal apparatus 15 as a mobile station. The base station 10 comprises an antenna 11 which transfers radio waves to/from the wireless relay amplification apparatus 20. From the base station 10, information indicating transmission power, for example, of the base station 10 as well as communication information to the user terminal apparatus 15 is transmitted as notification information 12.

The wireless relay amplification apparatus 20 comprises a base-station-side input/output terminal 21 and a mobile-station-side input/output terminal 22. A base station antenna 23 is connected to the base-station-side input/output terminal 21, and a mobile station antenna 24 is connected to the mobile-station-side input/output terminal 22. Further, a downlink input filter 25a and an uplink output filter 25b are connected to the base-station-side input/output terminal 21, and a downlink output filter 26a and an uplink input filter 26b are connected to the mobile-station-side input/output terminal 22.

A distributor 27, which distributes downlink signals to two, and a downlink amplifier 28 are provided in a downlink signal line between a downlink input filter 25a and a downlink output filter 26a. Further, an uplink amplifier 29 is provided in an uplink signal line between the uplink input filter 26b and the uplink output filter 25b.

The signals distributed by the distributor 27 are input to an automatic gain control receiver 31. The receiver 31 receives notification information 12 transmitted from the base station 10 and calculates loss of radio waves, i.e., propagation loss of radio waves between the base station 10 and the wireless relay amplification apparatus 20 based on the difference between the transmission power of the base station 10 included in the notification information 12 and the reception power received by the receiver 31, and outputs the calculated result to a controller 32.

The controller 32 controls gain of the uplink amplifier 29 based on the propagation loss calculated by the receiver 31 such that the noise included in the radio waves transmitted from the wireless relay amplification apparatus 20 to the base station 10 does not affect the reception system of the base station 10. Further, the controller 32 controls the gain of the downlink amplifier 28 provided in the downlink signal line, too.

As described above, in the conventional wireless relay amplification apparatus 20, radio waves transmitted from the base station 10 are received by the base station antenna 23, and the received signals are distributed by the distributor 27 and input to the receiver 31. The receiver 31 calculates propagation loss of radio waves based on the difference between the transmission power of the base station 10 included in the notification information 12 from the base station 10 and the reception power received by the receiver 31. Based on the calculated result and the like, the controller 32 controls the gain of the uplink amplifier 29 and the downlink amplifier 28.

As a publicly-known technique relating to the present invention, in a wireless relay amplification apparatus which amplifies and transmits received input waves as output waves, the technique of performing the following operations until the gain reaches an optimum value within the range in which oscillation does not occur due to interference waves is known, i.e., the operations of sufficiently decreasing the gain when the power is turned on to prevent oscillation due to interference waves included in the output waves and received along with the input waves and increasing the gain stepwise, and generating cancellation waves to cancel the interference waves and amplifying the input waves which synthesized the interference waves and the cancellation waves (see Jpn. Pat. Appln. KOKAT Publication No. 2000-286772, for example).

In the conventional wireless relay amplification apparatus 20 as shown in FIG. 9, the receiver 31 is designed to realize an automatic gain control function (intelligent function) of automatically controlling the gain in consideration of noise figure, for example, so as not to affect the reception system of the base station 10, by means of the notification information 12 transmitted from the base station 10 and the level of the received signals. The receiver 31 plays an important role in operation of the apparatus. When the notification information cannot be received, continuation of operation of the apparatus becomes very difficult.

In particular, when the wireless relay amplification apparatus 20 is used in open space, radio wave interference occurs when the isolation degree 33 between the base station antenna 23 and the mobile station antenna 24 deteriorates. Thereby, the input to the apparatus is synthesized with the output from the apparatus, which causes deterioration in waveform quality. When the isolation degree 33 becomes lower than the gain of the apparatus, oscillation occurs, and the relay amplification operation cannot be continued.

BRIEF SUMMARY OF THE INVENTION

In accordance with an aspect of the invention, there is provided a wireless relay amplification apparatus which relays radio waves between a base station and a mobile station and comprises a canceller which generates cancellation waves to cancel interference waves from a mobile station antenna, which are included in downlink signals received by the base station antenna, a downlink amplifier which amplifies downlink signals from which the interference waves have been canceled by the canceller, an uplink amplifier which amplifies uplink signals received by the mobile station antenna, a receiver which detects a level of received signals based on the downlink signals from which the cancellation waves have been canceled by the canceller, and outputs a propagation loss calculated based on a difference between the detected reception level and a transmission level of the base station included in notification information in the downlink signals, and a controller which controls gain of at least one of the downlink amplifier and the uplink amplifier based on the propagation loss output by the receiver.

According to another aspect of the present invention, the receiver detects a reception level of downlink signals after being amplified by the downlink amplifier.

According to another aspect of the present invention, the apparatus further comprises a filter provided between the canceller and the downlink amplifier and configured to selectively allow passage of or cut off the received signals.

According to another aspect of the present invention, the apparatus further comprises a switcher configured to switch such that the downlink signals from which interference waves have been canceled are input to the receiver when the filter allows passage of the received signals, and downlink signals from which interference waves have yet to be canceled by the canceller are input to the receiver when the filter cuts off the received signals.

According to another aspect of the present invention, the apparatus further comprises a switcher configured to switch such that the downlink signals from which interference waves have been canceled by the canceller are input to the receiver upon occurrence of the interference waves, and downlink signals from which interference waves have yet to be canceled by the canceller are input to the receiver upon nonoccurrence of the interference waves.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 1 is a block diagram showing a configuration of the wireless relay amplification apparatus according to a first embodiment of the present invention.

FIG. 2 is a block diagram showing a configuration of the wireless relay amplification apparatus according to a second embodiment of the present invention.

FIG. 5 is a block diagram showing a configuration of the wireless relay amplification apparatus according to a fifth embodiment of the present invention.

FIG. 6 is a block diagram showing a configuration of the wireless relay amplification apparatus according to a sixth embodiment of the present invention.

FIG. 7 is a block diagram showing a configuration of the wireless relay amplification apparatus according to a seventh embodiment of the present invention.

FIG. 8 is a block diagram showing a configuration of the wireless relay amplification apparatus according to an eighth embodiment of the present invention.

FIG. 9 is a block diagram showing a configuration example of a conventional wireless relay amplification apparatus.

DETAILED DESCRIPTION OF THE INVENTION

Figure 3:
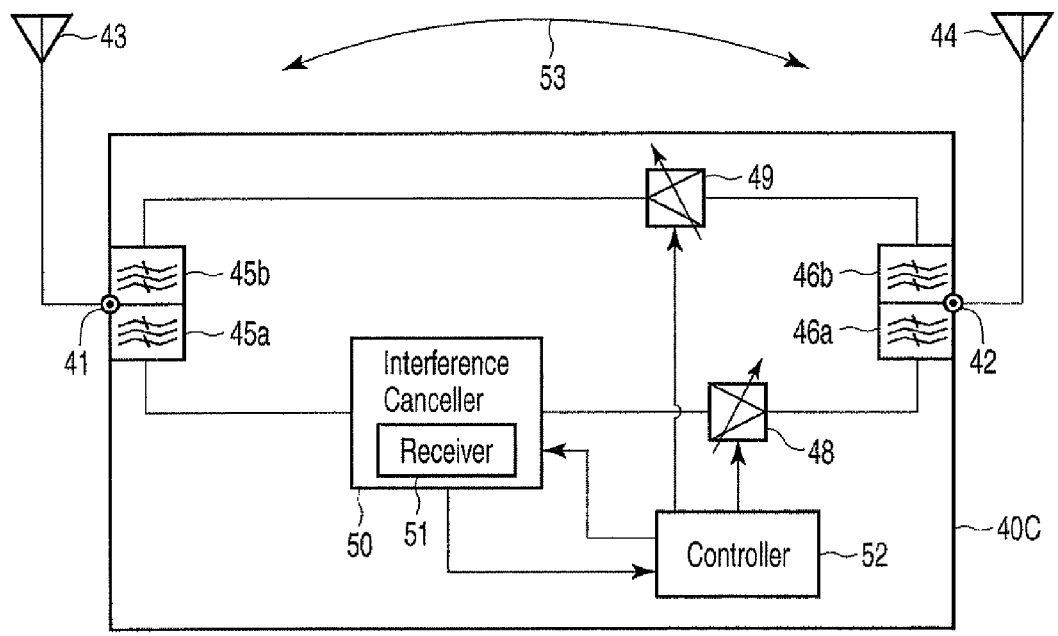
FIG. 3 is a block diagram showing a configuration of the wireless relay amplification apparatus according to a third embodiment of the present invention.

Hereinafter, embodiments of the present invention will be described with reference to the accompanying drawings.

First Embodiment

FIG. 1 is a block diagram showing a configuration of a wireless relay amplification apparatus 40A according to the first embodiment.

The wireless relay amplification apparatus 40A relays radio waves between a base station 10 and a user terminal apparatus 15 as a mobile station, as described above with reference to FIG. 9. From the base station 10, information indicating transmission power of the base station 10 as well as communication information to the user terminal apparatus 15 is transmitted as notification information 12.

The wireless amplifier 40A includes a base-station-side input/output terminal 41 and a mobile-station-side input/output terminal 42. A base station antenna 43 is connected outside of the base-station-side input/output terminal 41, and a mobile station antenna 44 is externally connected outside of the mobile-station-side input/output terminal 42.

A downlink input filter 45a and an uplink output filter 45b are connected inside of the base-station-side input/output terminal 41, and a downlink output filter 46a and an uplink input filter 46b are connected inside of the mobile-station-side input/output terminal 42. The downlink input filter 45a and the downlink output filter 46a select the frequency of the downlink signals transmitted from the base station to the user terminal apparatus, and the uplink input filter 46b and the uplink output filter 45b select the frequency of the uplink signals transmitted from the user terminal apparatus to the base station.

A distributor 47 using a directional coupler, for example, and a downlink amplifier 48 are provided in the downlink signal line between the downlink input filter 45a and the downlink output filter 46a. Further, an interference canceller 50 is provided between the distributor 47 and the downlink amplifier 48. The interference canceller 50 generates signals (cancellation waves) for canceling interference waves interfering with the base station antenna 43 from the mobile station antenna 44. An uplink amplifier 49 is provided in the uplink signal line between the uplink input filter 46b and the uplink output filter 45b.

The signals distributed by the distributor 47 are input to a receiver 51 for automatic gain control. The receiver 51 receives notification information transmitted from the base station and detects the reception level of the signals input to the receiver 51. The receiver 51 has an automatic gain control function (intelligent function) of automatically controlling the gain in consideration of noise figure, for example, so as not to affect the reception system of the base station, in which the radio wave propagation loss is least. The receiver 51 calculates loss of radio waves, i.e., propagation loss of radio waves between the base station and the wireless relay amplification apparatus 40A, based on the difference between the transmission power of the base station included in the notification information from the base station and the received power, and outputs the calculated result to the controller 52.

The controller 52 controls the gain of at least one of the uplink amplifier 49 and the downlink amplifier 48 based on the propagation loss calculated by the receiver 51, such that the noise included in the radio waves transmitted from the base station antenna 43 of the wireless relay amplification apparatus 40A to the base station does not affect the reception system of the base station.

In the aforementioned configuration, the downlink signals from the base station received by the base station antenna 43 are input to the base-station-side input/output terminal 41 of the wireless relay amplification apparatus 40A. The downlink signals input to the base-station-side input/output terminal 41 are selected by the downlink input filter 45a, output from the mobile-station-side input/output terminal 42 via the distributor 47, the interference canceller 50, the downlink amplifier 48, and the downlink output filter 46a, and transmitted from the mobile station antenna 44 to the user terminal apparatus.

The uplink signals from the user terminal apparatus received by the mobile station antenna 44 are input to the mobile-station-side input/output terminal 42 of the wireless relay amplification apparatus 40A. The uplink signals input to the mobile-station-side input/output terminal 42 are selected by the uplink input filter 46b, amplified by the uplink amplifier 49, and then output from the base-station-side input/output terminal 41 via the uplink output filter 45b to be transmitted to the base station from the base station antenna 43.

On the other hand, in the downlink signal line, the downlink signals selected by the downlink input filter 45a are distributed by the distributor 47 to the receiver 51. The receiver 51 calculates propagation loss of radio waves between the base station and the wireless relay amplifier 40A based on the difference between the transmission power of the base station included in the notification information from the base station and the actually received reception power, and outputs the calculated result to the controller 52.

The controller 52 controls the gain of the uplink amplifier 49 to an optimum value based on the propagation loss calculated by the receiver 51 such that the noise included in the radio waves transmitted from the base station antenna 43 to the base station does not affect the reception system of the base station.

Even when radio wave interference occurs from the mobile station antenna 44 to the base station antenna 43 as described above, such interference waves can be canceled by cancellation waves generated by the interference canceller 50, and the waveform quality of the downlink signals transmitted from the mobile station antenna 44 to the user terminal apparatus can be prevented from deteriorating.

Second Embodiment

Next, the wireless relay amplification apparatus according to the second embodiment of the present invention will be described with reference to FIG. 2.

FIG. 2 is a block diagram showing a configuration of a wireless relay amplification apparatus 40B according to the second embodiment. In the wireless relay amplification apparatus 40B, an interference canceller 50, provided between the distributor 47 and the downlink amplifier 48 in the wireless relay amplification apparatus 40A according to the first embodiment, is provided between a downlink input filter 45a and a distributor 47. The other structures are the same as those of the first embodiment. The same elements are denoted by the same reference symbol, and a detailed description of such elements will be omitted herein.

As described in the first embodiment, by providing an interference canceller 50 between the distributor 47 and the downlink amplifier 48, even when radio wave interference occurs from the mobile station antenna 44 to the base station antenna 43, the waveform quality of radio waves transmitted from the mobile station antenna 44 to the user terminal apparatus is improved by the interference canceller 50. However, since the input signals of the receiver 51 do not pass through the interference canceller 50, the waveform quality may deteriorate. Even when the interference is within the range which can be sufficiently covered by the interference cancellation function, the reception may become unstable.

According to the second embodiment, the interference canceller 50 is provided at the previous stage of the distributor 47, and thereby the waveform quality of signals input to a receiver 51 is improved. That is, downlink signals from which interference waves have been canceled by the interference canceller 50 are input to the receiver 51. As a result, even when radio wave interference occurs from the mobile station antenna 44 to the base station antenna 43, if the interference waveforms are within the range which can be improved by the interference canceller 50, the reception characteristics and the reception level measurement precision can be improved by improving the transmission waveform quality of the apparatus and the waveform quality of signals input to the receiver 51. Thereby, the automatic gain control function can be realized, and the relay amplification operation can be continued.

Third Embodiment

Next, the wireless relay amplification apparatus according to the third embodiment of the present invention will be described with reference to FIG. 3.

FIG. 3 is a block diagram showing a configuration of a wireless relay amplification apparatus 40C according to the third embodiment. In the wireless relay amplification apparatus 40B of the second embodiment, the interference canceller 50 and the receiver 51 are separately and independently provided. On the other hand, in the wireless relay amplification apparatus 40C, a receiver 51 is provided inside an interference canceller 50. The other structures are the same as those of the first embodiment and the second embodiment. The same elements will be denoted by the same reference number, and a detailed description of such elements will be omitted herein.

In the third embodiment, too, in which the receiver 51 is provided inside the interference canceller 50 as described above, downlink signals from which interference waves have been canceled by the interference canceller 50 may be input to the receiver 51. Thus, the same effect as can be obtained by the second embodiment can be obtained. That is, the reception level measurement precision and the reception characteristics at the time of occurrence of radio wave interference can be improved, and the relay amplification operation can be continued up to the isolation degree at which the interference canceller effectively works. Further, since the receiver 51 is provided inside the interference canceller 50, a distributor for distributing downlink signals to the receiver 51 is unnecessary, and the circuit configuration can be simplified.

Fourth Embodiment

Next, the wireless relay amplification apparatus according to the fourth embodiment of the present invention will be described with reference to FIG. 4.

Figure 4:
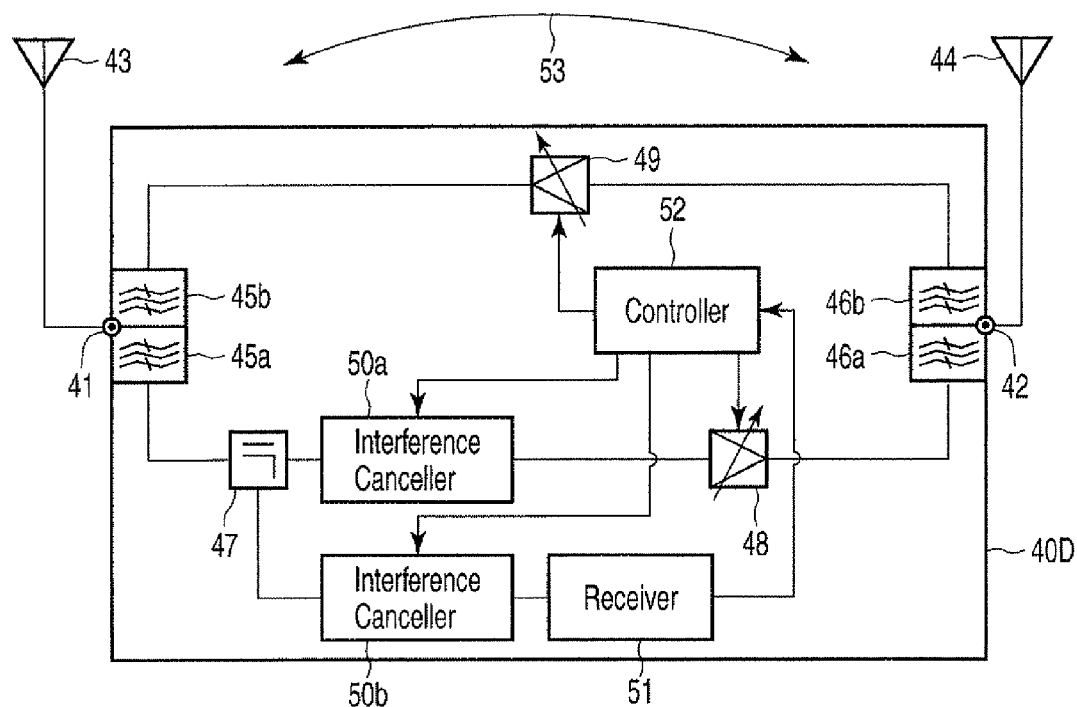
FIG. 4 is a block diagram showing a configuration of the wireless relay amplification apparatus according to a fourth embodiment of the present invention.

FIG. 4 is a block diagram showing a configuration of a wireless relay amplification apparatus 40D according to the fourth embodiment. In the wireless relay amplification apparatus 40D, a first interference canceller 50a is provided between a distributor 47 and a downlink amplifier 48 as in the case of the first embodiment shown in FIG. 1, and a receive-only second interference canceller 50b is provided between the distributor 47 and a receiver 51. The other structures are the same as those of the first embodiment. The same elements will be denoted by the same reference numbers and a detailed description will be omitted herein.

In the wireless relay amplification apparatus 40D, in the downlink signal line in which the relay amplification is performed, the waveform quality of downlink signals is improved by the first interference canceller 50a, and the downlink signals are transmitted to the user terminal apparatus from the mobile station antenna 44.

Further, signals distributed by the distributor 47 are input to the receiver 51 via the receive-only second interference canceller 50b. As a result, even when radio wave interference occurs, the waveform quality of the signals input to the receiver 51 can be maintained favorably, and the automatic gain control operation and the relay amplification operation can be continued within the range in which the cancellation function works by improving the reception level measurement precision and the reception characteristics.

Fifth Embodiment

Next, the wireless relay amplification apparatus according to the fifth embodiment of the present invention will be described with reference to FIG. 5.

FIG. 5 is a block diagram showing a configuration of a wireless relay amplification apparatus 40E according to the fifth embodiment. In the wireless relay amplification apparatus 40E, a distributor 47, provided at the previous stage of the interference canceller 50 in the wireless relay amplification apparatus 40A according to the first embodiment, is provided at the subsequent stage of the interference canceller 50 and the downlink amplifier 48, i.e., between the downlink amplifier 48 and the downlink output filter 46a. The other structures are the same as those of the first embodiment. The same elements will be denoted by the same reference number and a detailed description will be omitted herein.

In the wireless relay amplification apparatus 40E with the above-described configuration, in the downlink signal line in which the relay amplification is performed, the waveform quality of downlink signals selected by the downlink input filter 45a is improved by the interference canceller 50, and the downlink signals are amplified by the downlink amplifier 48 and then transmitted to the user terminal apparatus from the mobile station antenna 44.

Further, the downlink signals, the waveform quality of which has been improved by the interference canceller 50, are amplified by the downlink amplifier 48, and then distributed by the distributor 47 and input to the receiver 51. As a result, even when radio wave interference occurs, the reception level measurement precision and the reception characteristics at the receiver 51 can be improved, and the relay amplification operation can be continued up to the isolation degree at which the interference canceller 50 effectively works.

Sixth Embodiment

Next, the wireless relay amplification apparatus according to the sixth embodiment of the present invention will be described with reference to FIG. 6.

FIG. 6 is a block diagram showing a configuration of a wireless relay amplification apparatus 40F according to the sixth embodiment. In the wireless relay amplification apparatus 40F, a filter 55 is provided in the interference canceller 50 of the wireless relay amplification apparatus 40E according to the fifth embodiment. Further, a switcher 56 is provided in a receiver 51 and downlink signals selected by a downlink input filter 45a are distributed to the interference canceller 50 and the receiver 51. The other structures are the same as those of the first embodiment. The same elements will be denoted by the same reference number and a detailed description will be omitted herein.

Some wireless relay amplification apparatuses include a filter 55 formed of a digital filter, an analog filter, and so forth in an interference canceller. By providing the filter 55, it is possible to control whether to allow passage of or cut off each carrier. According to the input radio waves, the filter can be controlled with respect to each carrier. However, when a digital filter, for example, is provided in the interference canceller 50 in the wireless relay amplification apparatus 40E of the fifth embodiment to allow passage of or cut off carriers and suppress gain out of the band, and the carriers are cut off with this configuration, since the cut-off carriers cannot pass through the filter, the receiver 51 can receive notification information included in the passed carriers, but cannot receive notification information included in the cut-off carriers.

In consideration of the above, the downlink signals selected by the downlink input filter 45a are distributed by a distributor 47a before being input to the interference canceller 50, and input to the switcher 56 provided inside the receiver 51, as shown in FIG. 6. Further, waveforms which have passed through the interference canceller 50 to suppress deterioration due to interference are distributed by a distributor 47b and input to the switcher 56 of the receiver 51. When the carriers are set to a pass state by the filter 55, by selecting route B shown in FIG. 6 by the switcher 56, the effect caused by radio wave interference can be minimized, and the reception precision can be improved.

Further, when the carriers are set to a cut-off state by the filter 55, since cut-off carriers cannot be received via route B and do not pass through the paths of interference and amplification, waveform deterioration and oscillation due to interference do not occur. Therefore, selection of route A shown in FIG. 6 by the switcher 56 does not affect the waveform quality. Further, since the carriers are received via the route before being cut off by the filter 55, reception can be performed properly.

In another embodiment, control over a switcher 56 for selecting route A or route B may be performed by a receiver 51 or a controller 52. For example, when the switcher 56 selects route B and the receiver 51 cannot receive notification information included in carriers via route B, the controller 52 or the switcher 56 may judge that the carriers are cut off by the filter 55 and control the switcher 56 to switch to route A.

Seventh Embodiment

Next, the wireless relay amplification apparatus according to the seventh embodiment of the present invention will be described with reference to FIG. 7.

FIG. 7 is a block diagram showing a configuration of a wireless relay amplification apparatus 40G according to the seventh embodiment. In the wireless relay amplification apparatus 40G, a receiver 51 and a switcher 56 is additionally provided in the interference canceller 50 of the wireless relay amplification apparatus 40E according to the sixth embodiment. The other structures are the same as those of the first embodiment. The same elements will be denoted by the same reference number and a detailed description will be omitted herein.

In the above-described case where a filter 55 and the receiver 51 are included in the interference canceller 50, in order to receive carriers cut off by the filter 55 as in the case of the sixth embodiment, the signals prior to processing by the interference canceller 50 need to be extracted. Further, when the filter 55 is configured to allow passage of the carriers in order to minimize the effect caused by radio wave interference, signals subjected to cancellation processing need to be extracted and received. By switching signals by the switcher 56 in the interference canceller 50, as shown in FIG. 7, notification information included in the carriers can be received, regardless of the state of the filter 55. When the receiver 51 realizes the reception function by hardware in which the receiver 51 is integrally formed with the interference canceller 50 by means of signal processing, addition of hardware for switching of the signals input to the receiver 51 is unnecessary, and such a function can be realized without incurring additional cost.

Eighth Embodiment

Next, the wireless relay amplification apparatus according to the eighth embodiment of the present invention will be described with reference to FIG. 8.

FIG. 8 is a block diagram showing a configuration of a wireless relay amplification apparatus 40H. In the wireless relay amplification apparatus 40H, an interference canceller 50 and a filter 55 are configured as separate hardware units. The other structures are the same as those of the first embodiment. The same elements will be denoted by the same reference number and a detailed description will be omitted herein.

When the interference canceller 50 and the filter 55 are formed as separate hardware units as shown in FIG. 8, a distributor 47 is provided between the interference canceller 50 and the filter 55, such that the signals prior to cut-off of carriers by the filter 55 are input to the receiver 51. Even when the carriers are cut off by the filter 55 by minimizing the quality deterioration at the time of occurrence of interference, signals can be input to the receiver 51 without being affected thereby, and can be received regardless of the state of the filter 55.

In the above-described the sixth and the seventh embodiments, the interference canceller has a function of determining whether the interference waves have occurred. When the interference canceller judges that such interference has occurred, the switcher may be configured to switch such that the downlink signals from which the interference waves have been canceled by the interference canceller are input to the receiver. On the other hand, when the interference canceller j judges that such interference has not occurred, the switcher may be configured to switch such that the downlink signals from which the interference waves have yet to be canceled by the interference canceller are input to the receiver.

As described in the above-described embodiments, by providing the interference canceller 50 in the wireless relay amplification apparatus with the automatic gain control function, interference waves from the mobile station antenna 44 to the base station antenna 43 can be canceled to prevent deterioration of input waveform quality. It is therefore possible to prevent the problem that notification information cannot be received due to deterioration of input waveform quality and the relay amplification operation is interrupted.

Moreover, when a receiver is connected to a wireless relay amplification apparatus additionally provided with the function of allowing passage of or cutting off each carrier after the carriers pass through the interference canceller, the cut-off frequencies cannot be received, and the operation of detecting new frequencies, for example, cannot be performed. However, according to the above-described embodiments, by receiving cut-off frequencies at the previous stage of the interference canceller, all the frequencies may be received.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A wireless relay amplification apparatus which relays radio waves between a base station and a mobile station, comprising:
a base station antenna which receives radio waves from the base station;
a mobile station antenna which transmits radio waves to the mobile station;
a canceller which generates cancellation waves to cancel interference waves from the mobile station antenna, the interference waves being included in downlink signals received by the base station antenna;
a downlink amplifier which amplifies downlink signals from which the interference waves have been canceled by the canceller;
an uplink amplifier which amplifies uplink signals received by the mobile station antenna;
a receiver which detects a level of received signals based on the downlink signals from which the cancellation waves have been canceled by the canceller, and outputs a propagation loss calculated based on a difference between the detected reception level and a transmission level of the base station included in notification information in the downlink signals; and
a controller which controls gain of at least one of the downlink amplifier and the uplink amplifier based on the propagation loss output by the receiver.

2. The apparatus according to claim 1, wherein the receiver detects a reception level of downlink signals after being amplified by the downlink amplifier.

3. The apparatus according to claim 1, further comprising a filter provided between the canceller and the downlink amplifier and configured to selectively allow passage of or cut off the received signals.

4. The apparatus according to claim 3, further comprising a switcher configured to switch such that the downlink signals from which interference waves have been canceled are input to the receiver when the filter allows passage of the received signals, and downlink signals from which interference waves have yet to be canceled by the canceller are input to the receiver when the filter cuts off the received signals.

5. The apparatus according to claim 3, further comprising a switcher configured to switch such that the downlink signals from which interference waves have been canceled by the canceller are input to the receiver upon occurrence of the interference waves, and downlink signals from which interference waves have yet to be canceled by the canceller are input to the receiver upon nonoccurrence of the interference waves.

* * * * *